(12) United States Patent
Studer et al.

(10) Patent No.: US 10,327,435 B2
(45) Date of Patent: Jun. 25, 2019

(54) LED INSECT LIGHT TRAP WITH LIGHT TRANSMISSIVE GLUE BOARD

(71) Applicant: GARDNER MANUFACTURING CO., INC., Horicon, WI (US)

(72) Inventors: Bruce R. Studer, Germantown, WI (US); Timothy M. Jones, Phoenix, AZ (US)

(73) Assignee: Gardner Manufacturing Co., Inc., Horicon, WI (US)

( * ) Notice: Subject to any disclaimer, the term of this patent is extended or adjusted under 35 U.S.C. 154(b) by 338 days.

(21) Appl. No.: 15/395,941

(22) Filed: Dec. 30, 2016

(65) Prior Publication Data

US 2017/0295772 A1 Oct. 19, 2017

Related U.S. Application Data (63) Continuation-in-part of application No. 15/132,558, filed on Apr. 19, 2016, now Pat. No. 10,143,191.

(51) Int. Cl.
| | |
|---|---|
| *A01M 1/04* | (2006.01) |
| *A01M 1/14* | (2006.01) |
| *A01M 1/10* | (2006.01) |
| *H05B 33/08* | (2006.01) |

(52) U.S. Cl.
CPC .......... *A01M 1/145* (2013.01); *A01M 1/106* (2013.01); *H05B 33/0815* (2013.01)

(58) Field of Classification Search
CPC .......... A01M 1/02; A01M 1/04; A01M 1/106; A01M 1/14; A01M 1/145
See application file for complete search history.

(56) References Cited

U.S. PATENT DOCUMENTS

| | | | | |
|---|---|---|---|---|
| 3,894,351 | A | * 7/1975 | Iannini | A01M 1/04 43/112 |
| 4,117,624 | A | * 10/1978 | Phillips | A01M 1/145 43/113 |
| 5,550,451 | A | 8/1996 | Itoh et al. | |
| 5,634,292 | A | 6/1997 | Kitterman | |
| 6,108,965 | A | * 8/2000 | Burrows | A01M 1/145 43/113 |
| 6,393,759 | B1 | * 5/2002 | Brown | A01M 1/023 43/113 |
| 6,886,292 | B2 | 5/2005 | Studer et al. | |
| 6,965,205 | B2 | 11/2005 | Piepgras et al. | |
| 7,784,215 | B2 | 8/2010 | Cohnstaedt et al. | |

(Continued)

FOREIGN PATENT DOCUMENTS

| | | | | |
|---|---|---|---|---|
| EP | 3162202 A1 | * 5/2017 | | A01M 1/145 |
| WO | WO9220224 | 11/1992 | | |

*Primary Examiner* — Lisa L Tsang
(74) *Attorney, Agent, or Firm* — Dewitt LLP; Thomas J. Nikolai (57) ABSTRACT

Insect capture is improved by providing a glue board having an adhesive coating on its front surface and forming a pattern of insect attractant UV light on that front surface. That pattern includes areas of bright UV light generated by light-emitting diodes that generate light at different wavelengths behind and visible through the glue board by flying insects, dimmer areas of light generated by said light emitting diodes that bounces off other portions of the device onto the glue board, and areas of shadow on the glue board where no or little light from said light-emitting diodes is present.

17 Claims, 6 Drawing Sheets

(56) References Cited

U.S. PATENT DOCUMENTS

| | | |
|---|---|---|
| 7,937,887 B2 | 5/2011 | Child |
| 2003/0079398 A1* | 5/2003 | Holmes ................. A01M 1/145 43/113 |
| 2006/0218851 A1 | 10/2006 | Weiss et al. |
| 2007/0068068 A1* | 3/2007 | Weiss .................... A01M 1/023 43/132.1 |
| 2007/0124987 A1 | 6/2007 | Brown et al. |
| 2008/0229652 A1 | 9/2008 | Willcox et al. |
| 2010/0071257 A1 | 3/2010 | Tsai |
| 2010/0263260 A1* | 10/2010 | Engelbrecht ............ A01M 1/02 43/113 |
| 2016/0000060 A1 | 1/2016 | Sandford et al. |
| 2016/0262367 A1 | 9/2016 | Sandford et al. |

* cited by examiner

LED INSECT LIGHT TRAP WITH LIGHT TRANSMISSIVE GLUE BOARD

CROSS-REFERENCED TO RELATED APPLICATIONS

This application is a continuation-in-part of application Ser. No. 15/132,558, filed Apr. 19, 2016, entitled "INSECT LIGHT TRAP WITH LIGHT TRANSMISSIVE GLUE BOARD", which is deemed incorporated herein by reference in its entirety.

STATEMENT REGARDING FEDERALLY SPONSORED RESEARCH OR DEVELOPMENT

Not applicable.

BACKGROUND OF THE INVENTION

I. Field of the Invention

The present invention relates generally to insect traps. More specifically, the present invention relates to improvements to insect traps employing a light source as an insect attractant and a glue board as an insect capture device.

II. Discussion of Related Art

Those skilled in the art know that light provides an effective insect attractant and that light in the ultraviolet ("UV") range of the light spectrum is particularly attractive to many flying insects. UV light is light having a wave length generally in the range of 100 to 400 nanometers.

Based on this phenomena, designers of insect light traps have often employed fluorescent tubes incorporating phosphor that predominantly emits UV light instead of white light visible to humans. One advantage of such fluorescent UV tubes is that they can be "tuned" to give off peak light in very narrow UV ranges based upon the phosphor selected. For example, europium-doped strontium fluoroborate phosphor will produce a peak emission of light in the 368 to 371 nanometer range while lead-doped barium silicate phosphor will produce a peak emission of light in the 350 to 353 nanometer range. However, energy consumption by such light sources and disposal of such light sources create environmental issues. Health concerns can also arise if the fluorescent tube breaks and its contents are inhaled or ingested.

Those skilled in the art also know that an insect trap must not only lure the insects to the trap, but must also either capture or kill the insects that are lured to the trap. Four basic methods are used. First, electrical grids that electrocute the insects coming into contact with the grid have been used. These, however, are entirely unsuitable for restaurants and other areas where food is prepared or served due to splatter of bug parts. Second, various poisons have been employed, but the use of a poison is unacceptable where young children are present who might ingest the poison. Third, various mechanisms have been employed to move the insects into chambers from which the insect cannot escape. For flying insects, this technique typically involves the use of fans that create an airflow or current drawing the insects into a chamber and then preventing the insects from escaping. Fourth, adhesive surfaces such as those of glue boards have been used. Glue boards are generally safe, but a glue board coated with flying insects is generally unsightly and unpleasant to look at. Also, if the light source is any distance from the glue board, insects attracted to the light source may never come into contact with the glue board and, thus, may fly away without being captured.

In view of the foregoing, there is a real need for improvements in flying insect trap design, both in terms of insect attraction and capture.

SUMMARY OF THE INVENTION

The present invention relates to insect traps including a light source, a glue board and a housing. The light source comprises an electronic circuit including a plurality of spaced apart light-emitting diodes adapted to emit light in differing portions of the light spectrum. The glue board includes a substrate having front and back sides and an adhesive layer coating a selected portion of the front side. The glue board is adapted to permit UV light to pass through the glue board. This can be achieved by making the glue board out of UV transparent or UV translucent materials, or perforating the glue board if the substrate is made of a material otherwise opaque to UV light.

The housing is adapted to hold the electronic circuit and the glue board so that the front side of the glue board coated with the adhesive faces away from the electronic circuit and the light-emitting diodes emit UV light through the glue board. The housing also has a front panel including openings defined by closed sections having edges. The openings permit flying insects to enter the trap through such openings. The openings also permit the adhesive layer of the glue board to be viewed through such openings by flying insects. The closed sections are adapted to cause at least some of the light from the light-emitting diodes reaching the closed sections to bounce off the closed sections and on to the adhesive layer coating a portion of the front surface of the glue board. The closed sections also serve to at least partially mask from the view of humans standing or sitting in the room insects stuck to the glue board.

When a trap having the above-described features is in use and the adhesive layer of the glue board is viewed by flying insects through the openings in the front panel of the housing, a pattern is presented on the glue board comprising bright direct UV light from the light-emitting diodes, dimmer bounced UV light and shadows.

The various components described above may include other features. The electronic circuit may be adapted to be powered by household current. The electronic circuit may be coupled to prongs projecting directly from a flat surface on the back of the housing and adapted to be plugged into a standard electrical socket such that the prongs not only supply power to the circuit, but also physically support the insect trap. Alternatively, a battery may power the electrical circuit and an alternative mounting means may be employed to hang the trap on a wall, ceiling or other stable structure.

Also, the light-emitting diodes of the circuit may be arranged in a pattern. That pattern may comprise at least two rows of light-emitting diodes. When the glue board has perforations, those perforations may be arranged in the same pattern as the pattern of the light-emitting diodes. The light-emitting diodes may also be adapted to emit light in both the ultraviolet and visible light ranges. The electrical circuit comprising the light-emitting diodes may also be designed to cause the light-emitting diodes to selectively dim and brighten or cycle on and off to increase insect attraction.

Alternatively, the LEDs may be selected and arranged to cast light in a pattern attractive to flying insects generally or to specific species of insects. The LEDs may be selected or adapted to cast light at different wavelengths. For example, a first group of LEDs used may cast light in the 5000K range approximately soft daylight. Another group of LEDs used may cast light at a wavelength of about 560 nm such that the light has a yellowish green color. Still another group of LEDs used may cast light that has a wavelength of about 430 nm so that it has a purple or blue color. Another group of LEDs used may cast light in the UV range such as light having a wavelength of 368 nm. The LEDs may be arranged so that the light emitted by the LEDs is directed onto an attraction surface (preferably the adhesive surface of a glue board) in a pattern highly attractive to the insects to be trapped. To humans, for example, this surface may have a violet or deep blue center area boarded by green areas between the center area and the edges of the attraction surface.

The electronic circuit may be provided to control the aforementioned groups of LEDs or individual LEDs. The electronic circuit may include a programmable microprocessor unit that controls when and which LEDs are on and off, which LEDs flicker and the duration and pattern of the flickering of the LEDs, the brightness of the LEDs, modulation of the brightness of the LEDs, the pattern of modulation of the LEDs, and the like. The output of the LEDs may also be controlled to account for ambient light conditions. Different programs may be used depending upon the species of insects that are the subject of extermination efforts, and to address ambient light conditions.

The glue board may be UV transparent or UV translucent. Alternatively, the glue board may be generally UV opaque, but have perforations which enable UV light to pass through the glue board. If generally UV opaque with perforations, the glue board may be colored black to partially mask from the human eye any insects stuck to the glue board. Otherwise, humans could see the insects due to the presence of ambient light even though humans cannot see the UV light generated by the light-emitting diodes. The adhesive may be selected to provide a glossy surface to increase insect attraction or to provide a matte surface to better hide the captured insects from the view of humans. The substrate or adhesive may be smooth to cause the UV light to bounce off the glue board in a specular manner, or may be textured to cause the UV light to bounce off the glue board in a more diffuse manner.

The housing may have an opening that permits the glue board to be quickly and easily removed and replaced without removing any portion of the housing. Also, the edges of the openings in the front of the housing may be adapted to be illuminated by the light-emitting diodes to essentially frame the openings with insect attractant light.

BRIEF DESCRIPTION OF THE DRAWINGS

The features and attributes which may be employed to practice the present invention will be better understood from a review of the detailed description provided below in conjunction with the accompanying drawings.

FIG. 5 is a perspective view of the trap of FIG. 1 with the glue board entirely removed from the housing;

DETAILED DESCRIPTION

This description of the preferred embodiment is intended to be read in connection with the accompanying drawings, which are to be considered part of the entire written description of this invention. In the description, relative terms such as "lower", "upper", "horizontal", "vertical", "above", "below", "up", "down", "top" and "bottom", "under", as well as derivatives thereof (e.g., "horizontally", "downwardly", "upwardly", "underside", etc.) should be construed to refer to the orientation as then described or as shown in the drawings under discussion. These relative terms are for convenience of description and do not require that the apparatus be constructed or operated in a particular orientation. Terms such as "connected", "connecting", "attached", "attaching", "joined", and "joining" are used interchangeably and refer to one structure or surface being secured to another structure or surface or integrally fabricated in one piece unless expressly described otherwise.

The flying insect trap 1 shown in the drawings comprises a housing 10, a glue board 50, and an electronic circuit 70. These elements combine to provide a unique display of insect attractant light directly on the front side 52 of the glue board 50. An adhesive coating 54 on the front side 52 of the glue board 50 captures any insects coming into contact with the front side 52 of the glue board 50.

The housing 10 shown in the drawings has a back compartment 12 in which electronic circuit 70 is stored. The back compartment 12 comprises a back wall 14. The back wall 14 has a flat surface and two electrical prongs 16 and 18 project from this flat surface. While the drawings show the entire back wall 14 to be flat, this is not necessary. For example, the portion of the back wall 14 surrounding the prongs 16 and 18 could be a generally flat surface with other portions of the wall being at an angle from, parallel to, or even having a contour other than the flat surface. The prongs 16 and 18 provide two functions when plugged into a standard electrical outlet (not shown) supplying household current. First, the prongs 16 and 18 supply electrical energy to the electronic circuit 70. Second, the prongs 16 and 18 support the entire insect traps 1.

Figure 1:
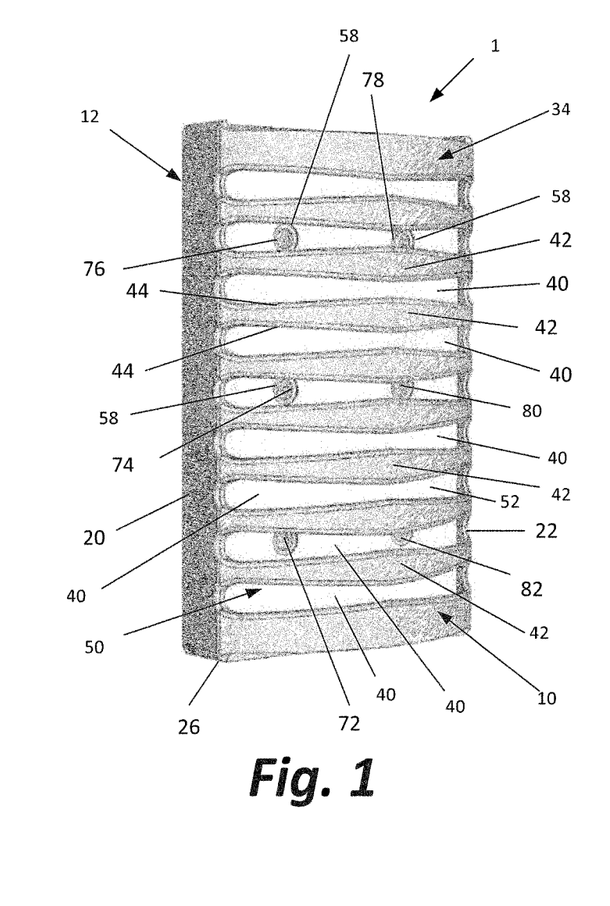
FIG. 1 is a perspective view showing the front of a flying insect trap.
Figure 2:
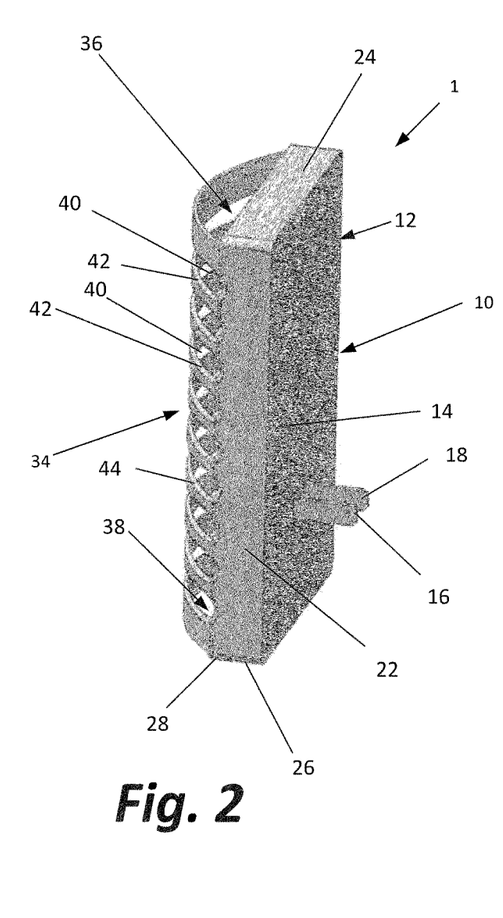
FIG. 2 is a perspective view showing the back of the trap of FIG. 1.
Figure 3:
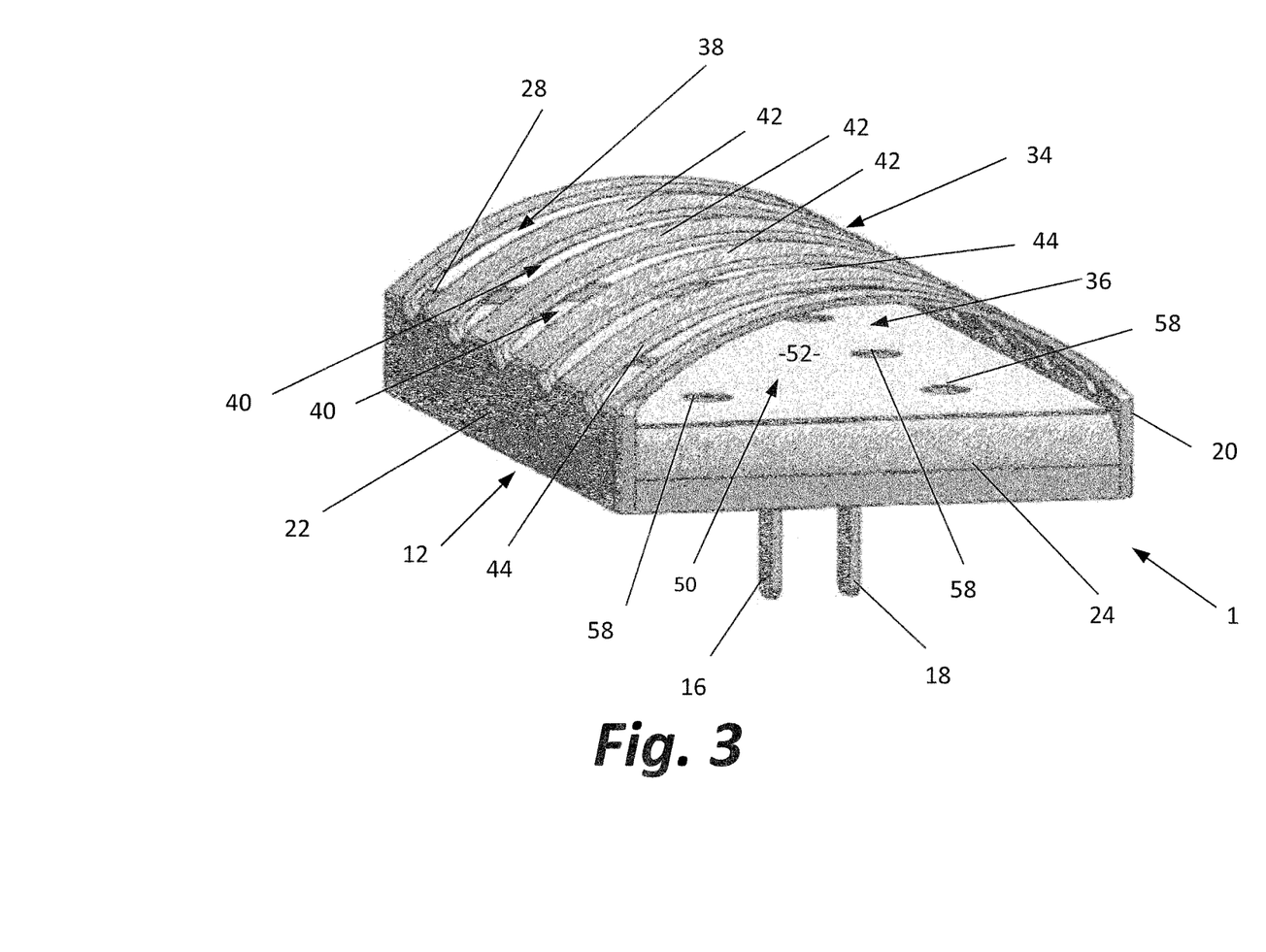
FIG. 3 is a perspective view showing the top of the trap of FIG. 1.
Figure 4:
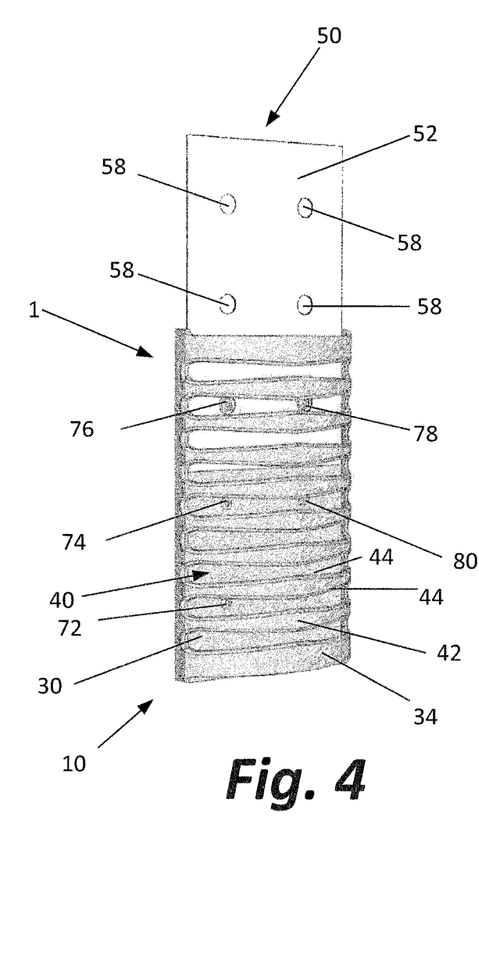
FIG. 4 is a perspective view of the trap of FIG. 1 with the glue board partially removed from the housing.
Figure 5:
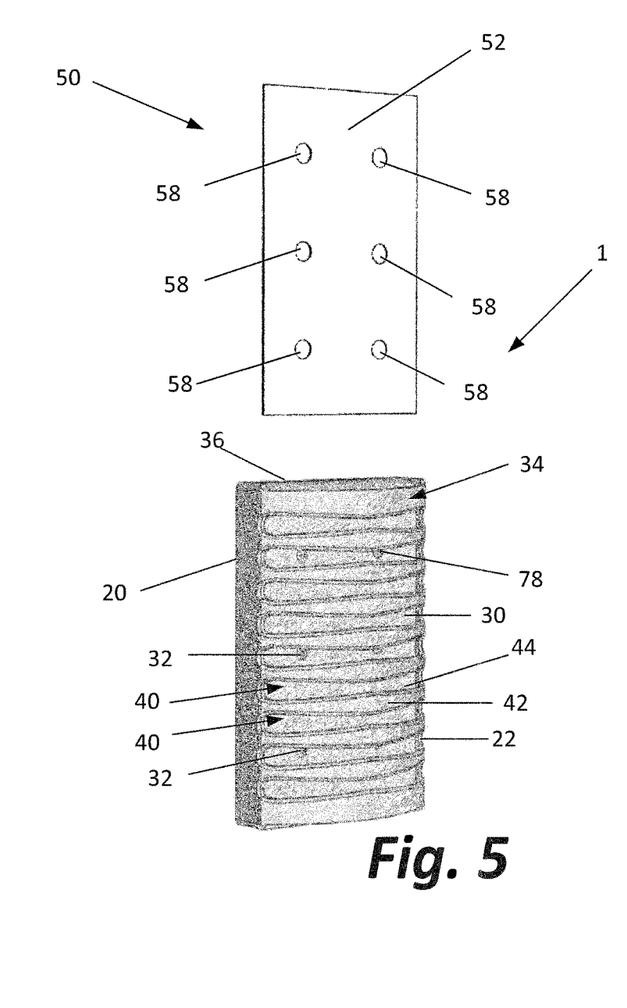

The back compartment 12 has two side walls 20 and 22, a top wall 24, and a bottom wall 26. The bottom wall includes an extension 28 that prevents the glue board 50 from falling out the bottom of the housing 10. As shown in FIGS. 4 and 5, the back compartment 12 also includes a front wall 30. As shown, the front wall has six round openings 32. Light-emitting diodes 72-82 are visible through the openings 32. The shape and number of these openings may vary without deviating from the invention.

In addition to the back compartment 12, the housing 10 has a front panel 34. The front panel 34 may be integrally formed with, permanently adhered to, or temporarily fastened to the back compartment 12. As shown in the drawings, the front panel 34 is coupled at its opposite edges to the two side walls 20 and 22 of compartment 12 and bows outwardly from the two side walls 20 and 22. This provides a large top opening 36 through which glue board 50 can be inserted, removed and replaced. While there is a similar opening 38 at the bottom, the extension 28 of the bottom wall 26 of back compartment 12 reduces the size of the bottom opening 38 preventing the glue board from dropping out the bottom of the trap 1 when the trap 1 is plugged into an electrical outlet.

The front panel 34 also includes a plurality of openings 40 defined by closed sections 42 having edges 44. The openings 40 and closed sections 42 are each generally elongate extending from side wall 20 to side wall 22. The openings 40 permit insects to enter and light to exit the trap. The openings 40 also permit the flying insect to view the insect attractant light display described below that is presented on the glue board 50. The closed sections 42 interfere with the ability of people to readily view any insects trapped on the glue board 50, prevent young children from touching the glue board 50 and the insects adhered to the adhesive layer 54 of glue board 50, and also help provide a display of light on the front surface 52 of glue board 50 that is highly attractive to flying insects.

Figures 6, 7:
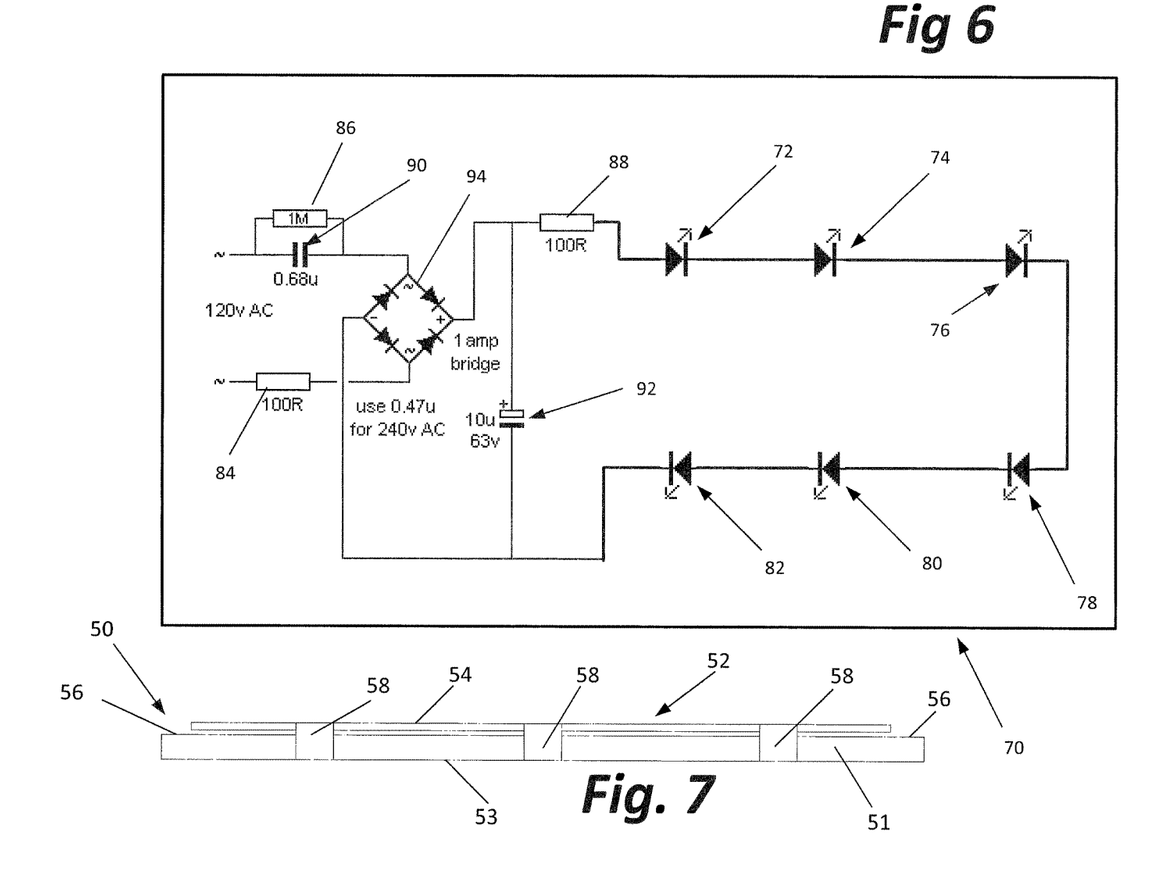
FIG. 6; is a schematic view of one example of a circuit that may be used to generate insect attracting light.
FIG. 7 is a cross-sectional view of the glue board of the insect trap of FIG. 1.

Glue board 50 comprises a substrate 51 and has a front side 52 and a back side 53. An adhesive layer 54 on the front side 52 coats a selected portion of the substrate 51. As shown in FIG. 6, the edges 56 of the substrate 51 are left uncoated so a user need not touch the adhesive layer 54 when replacing the glue board 50. The features of the glue board 50 discussed above are common to many glue boards offered by pest control device manufacturers. However, glue board 50 has distinguishing features. As shown in the drawings, the glue board 50 is adapted to permit UV light to pass through the glue board 50. This is achieved either by making the substrate of a UV light transmissive material (i.e., a UV transparent or a UV translucent material) or, as shown, by including a plurality of perforation 58 extending through at least the substrate 51.

Examples of such UV light transmissive materials include fused silica, calcium fluoride, magnesium fluoride and various acrylic sheets such as Acrylite Op-4 sold by CYRO Industries of Parsippany, N.J. These materials tend to be relatively expensive, so the less expensive option of perforating the substrates typically employed to construct glue boards may be preferred in certain situations. The number, position and shape of the perforations 58 correspond to the openings 32 in the front wall 30 of back compartment 12. When the glue board 50 is positioned in the housing 10, each perforation 58 is aligned with one of the openings 32 to provide pathways for UV light to exit the back compartment 12 and pass through the glue board 50.

The UV light referenced above is generated by electronic circuit 70. As shown in FIG. 6, the circuit 70 comprises six separate light-emitting diodes 72-82. The circuit further includes resistors 84, 86 and 88, capacitors 90 and 92 and a full waive rectifier bridge 94. Bridge 94 converts to direct current the 120 v alternating current supplied to the prongs 16 and 18 by the electrical outlet (not shown). The various resistors and capacitors control the delivery of electrical energy to the light-emitting diodes 72-82.

The electrical circuit 70 is adapted to fit in the back compartment 12 of the housing 10 so that the light-emitting diodes 72-82 are aligned with the openings 32 through the front wall 30 of back compartment 12. As such, light emitted by the light-emitting diodes can pass through openings 32, the perforations 58 of the glue board 50 when the glue board 50 is positioned in housing 10, and through openings 40 in the front panel 34 of housing 10. The light-emitting diodes 72-82 are of a type that generate peak output in the UV light range which is most attractive to flying insects. The circuit 70 may also be adapted to selectively dim and brighten the light-emitting diodes 72-82 (or to cycle them on and off) in a controlled sequence to increase insect attraction. The circuit may also be adapted to be powered by a battery supplying DC current.

The combination of elements described above is highly advantageous because it presents a light pattern on the front surface 52 of the glue board 50 that is highly attractive to flying insects. That pattern includes areas of bright direct UV light from the light-emitting diodes 72-82 that passes through openings 40 in the front panel 34, perforations 58 through the glue board 50 and openings 32 in the front wall 30 of the housing 10. That pattern also includes areas of dimmer UV light which travels from the light-emitting diodes 72-82 to the closed sections 42 of the front panel and bounces off the front panel back to the front surface 52 of the glue board 10. That pattern also includes areas of shadow on the front surface 52 of the glue board 50 where no or minimal direct or bounced UV light reaches the front of the glue board 50.

As noted above, the closed sections 42 of the front panel 34 have edges 44. The edges 44 are also illuminated by the light-emitting diodes 72-82 which is believed to aid in insect attractancy. The edges 44 frame the openings 40.

Further, the adhesive layer 54 on the front surface 52 of glue board 50 may be modified in various ways to enhance insect attractancy. The adhesive layer can be light transmissive in the UV range so that light from the light-emitting diodes 72-82 can travel through this layer. This is particularly important if the adhesive layer covers the perforations 58 or if the substrate 51 is made of a UV transparent or UV translucent material. The adhesive layer 54 can be made to diffuse the UV light or to cause the UV light to bounce off the front surface of the glue board 50 in a specular manner. Either of these effects can be achieved by modifying the chemistry of the adhesive material used or the physical nature of the adhesive surface. A rough surface will tend to diffuse the UV light. A smooth surface will act like a mirror.

Still further, the glue board 50 (or either the substrate or adhesive layer) may be stamped or otherwise textured with a preselected pattern of depressions and ridges that cause brighter and dimmer areas of UV light on the front surface 52 of the glue board 50. These ridges and depressions may also be arranged to provide either sharp or blurred lines of demarcation between areas of shadow and light.

Likewise, the light-emitting diodes may be randomly arranged or arranged in any suitable pattern for achieving insect attraction. The pattern may, for example, include two rows of light-emitting diodes, as illustrated. The pattern of holes 32 in the front wall 30 of the back compartment 12 and the pattern of the perforations 58 in the glue board should match the selected pattern of the light-emitting diodes 72-82. Likewise, the number, size, shape and arrangement of light-emitting diodes (and openings) should be adapted to that UV light is still present even if one of the perforations is blocked by the body of a captured insect.

Those skilled in the art of insect trap design have operated under the premise that UV light is an effective insect attractant. While this is generally true, a display of light of various wavelengths in both the UV and visible ranges provides even greater insect attraction. Such a display can be created using a plurality of LEDs that generate light in different wavelengths.

Figure 8:
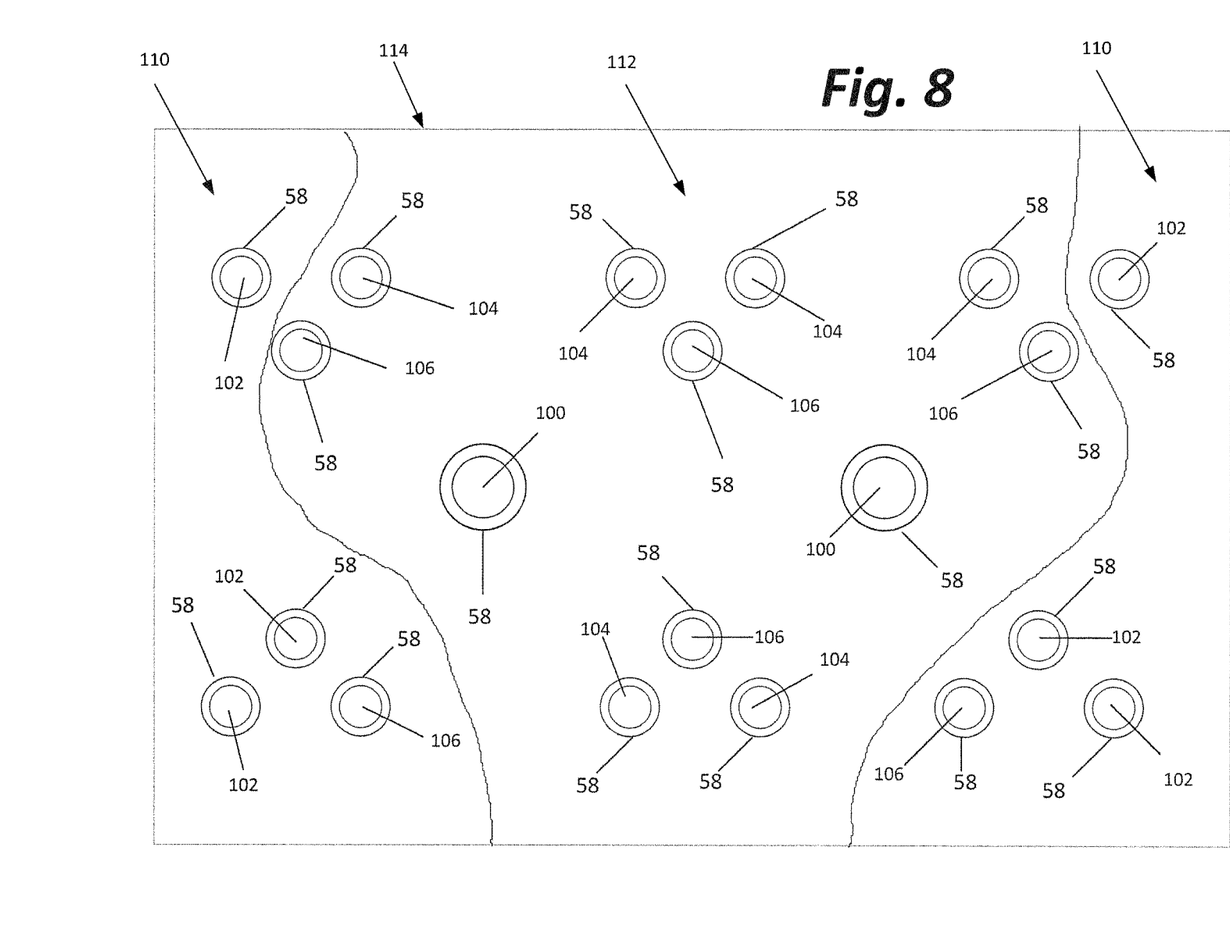
FIG. 8 is a schematic diagram showing how different groups of LEDs may be deployed to create a desired light pattern on an attraction surface such as the adhesive surface of a glue board.

One such display formed on an attraction surface, which may be the adhesive surface of a glue board 114, is shown in FIG. 8. The glue board has a plurality of holes 58 extending at least through the glue board's substrate. The LEDs 100, 102, 104 and 106 are arranged either behind the glue board so light emitted from the LEDs passes via the holes 58 through the glue board. Alternatively, the glue board and LEDs may be arranged and mounted such that the LEDs reside in or extend through the holes 58 of the glue board.

The pattern illustrated in FIG. 8 is created using four different sets of LEDs. A first set consists of LEDs 100. A second set consists of the LEDs 102. LEDs 104 provide a third set of LEDs and LEDs 106 provide a fourth set of LEDs. Each set of LEDs is adapted to emit light of a different wavelength than the other sets.

Specifically, the first set of LEDs, consisting of LEDs 100, produces soft white light emulating daylight, i.e., light in the range of 4000K to 6000K. Preferably, this light will have a wavelength of 5000K. Such light is visible to humans. The second set of LEDs, consisting of LEDs 102, produces light that is in the yellow or green portion of the visible light spectrum, i.e., light having a wavelength between 500 and 590 nm. Preferably, the light emitted by the second set of LEDs has a wavelength of 560 nm. In FIG. 8, LEDs 102 are positioned adjacent the right and left edges of glue board 114. As such, the areas designated 110 have a green tint.

The third set of LEDs, consisting of LEDs 104, produces light in the violet or blue portion of the visible light spectrum, i.e., light between 380 nm and 495 nm. Most preferably, the wavelength of the light generated by LEDs 104 has a wavelength of 430 nm. The LEDs 104 are located near the center of the glue board 114. As such, the area designated 112 has a blue or purple tint. The fourth set of LEDs, consisting of LEDs 106, generates light in the UV range, i.e., light having a wavelength at or below 400 nm. Preferably, the wavelength of light generated by LEDs 106 is in the UV-A range, i.e., between 315 nm and 400 nm. UV light having a wavelength of 368 nm has proven to be highly effective so the LEDs 106 may be selected to give off light of this wavelength. LEDs 106 are present in each section 110 and section 112. Thus, sections 110 of the glue board 114 are reflecting both green light and UV light and section 112 is reflecting both blue or violet light and UV light.

The light reflected off the glue board 114 is arranged in a pattern more attractive to flying insects, and particularly flies, than other patterns that have been employed. Also, because the pattern is cast directly on the adhesive layer, insects will fly to and land on that layer where they become captured in the adhesive. This, too, improves the efficacy of the trap. Further, while FIG. 8 shows a sharp line of demarcation between the outer sections 110 and the center section 112, these lines are blurred in actual use because of the way light traveling from the LED reaches the various portions of the glue board. Most of the light reaches the glue board directly from the LEDs. Some light from the LEDs is reflected from other features of the trap onto the glue board or alternative substrate of the attraction assembly.

Figure 9:
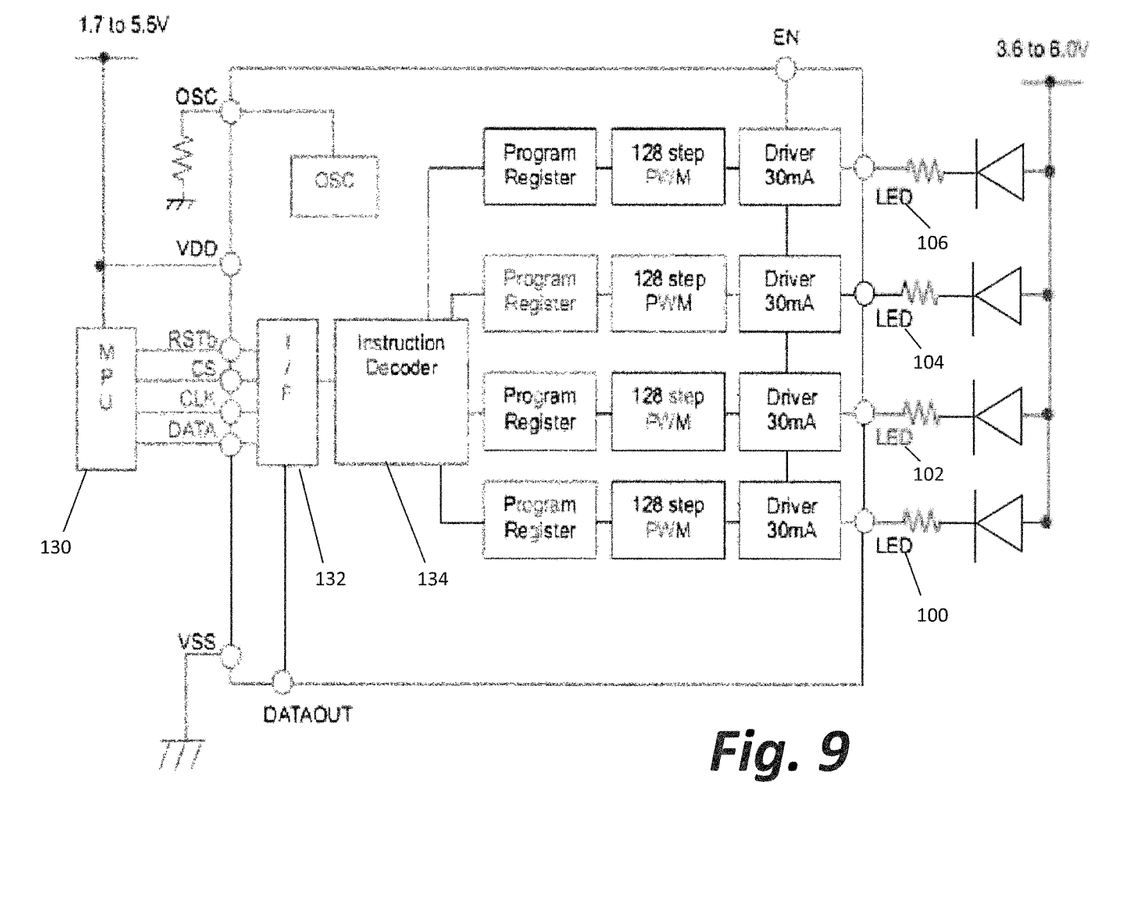
FIG. 9 is a schematic diagram of an alternative electronic circuit for displaying insect attractant light in accordance with a selected programmed set of instructions.

Additionally, a control circuit may be provided to permit separate control of each of the LEDs or group of LEDs. A schematic diagram of an exemplary control circuit 120 is illustrated in FIG. 9. As illustrated, the operation of each LED 100-104 is separately coupled to its own program register 122, pulse width modulator 124 and driver 126. This permits the on/off state of each LED to be separately controlled.

More specifically, various operating characteristics of each LED can be separately controlled to increase insect attraction. Examples include:
  Whether the LED is on or off;
  Whether the LED operates at a constant power output or whether the power output is modulated over time;
  If the power output is modulated over time, the pattern, timing, and amounts of changes in the power output;
  Whether the LED is constantly on or flickers on and off;
  If the LED flickers on and off, the pattern and timing of the flickering.

Further, these and other operating characteristics of each individual LED can be coordinated by the microprocessor unit 130 based on a preprogrammed set of instructions. A user can select between various programs which are individually tailored to address the specific species of insects to be captured and the light characteristics that achieves the best capture rate for such species. Such programs can also be individually tailored to take into account ambient light conditions or anticipated changes in ambient light conditions during the course of a day that can also affect insect attraction. The microprocessor unit 130 delivers these instructions via interface 132 to the instruction decoder 134. In turn, the instruction decoder 134 populates the separate program registers 122 associated with each separate LED based on the instructions provided by the microprocessor unit 130. The LEDs 100 through 106 are thus operated pursuant to the instructions provided by the microprocessor unit 130.

Various advantages arise from the trap described above. First, the light-emitting diodes 72-82 (or 100-106) generate intense UV light without requiring much in the way of electrical power. Second, the glue board 50 is easily replaced. Third, the openings 40 in the front panel 34 are large enough to permit flying insects to see the insect attractive UV light display on the front surface of the glue board, yet small enough such that the closed sections 42 effectively prevent children from reaching into the trap. Likewise, the closed sections 42 generally block from human view any insects stuck to the adhesive surface of the glue board 50. This is particularly true when the user is at a standing or seated position because of the height at which electrical outlets are typically mounted.

In certain embodiments, the insect attractant light pattern is on the glue board itself. Thus, insects attracted by the pattern are more likely to come into contact with the adhesive surface of glue board 50 than if the pattern is some distance from the glue board as is the case with prior art insect traps employing a glue board.

The foregoing description is intended to explain the various features and advantages, but is not intended to be limiting. The scope of the invention is defined by the following claims which are also intended to cover a reasonable range of equivalents.

What is claimed is:

1. An insect light trap comprising:
   a) an electronic circuit including a plurality of groups of light-emitting diodes, each of the groups of light-emitting diodes adapted to emit light in a different portion of the light spectrum;
   b) a substrate having a front side and a back side and adapted to allow light to pass through the substrate, said front side having at least one portion coated with an adhesive layer; and
   c) a housing comprising a front panel and a back compartment having a front wall, said front wall having a plurality of perforations, said housing adapted to hold the light-emitting diodes of the electronic circuit in the back compartment and the substrate between the back compartment and the front panel so that the front side of the substrate faces away from the light-emitting diodes of the electronic circuit and toward the front panel, and the light-emitting diodes of the electronic circuit are (i) located in the back compartment, (ii) aligned with the perforations of the front wall, and (iii) pointed directly toward the back side of the substrate through the plurality of perforations of the front wall so that the light generated by the light-emitting diodes of the electronic circuit passes through the substrate onto the adhesive layer, said front panel including openings defined by closed sections having edges, said openings adapted to permit flying insects to enter the trap through such openings and to permit the front side of the substrate to be viewed through such openings by the flying insects, and the closed sections adapted to cause at least some of the light from the light-emitting diodes reaching the closed sections to bounce off the closed sections and on to the adhesive layer, wherein, when the adhesive layer is viewed through the openings by the flying insects, a pattern is presented on the adhesive layer comprising light passing directly from the light-emitting diodes of each of the groups of light-emitting diodes through the substrate and on to the adhesive layer, reflected light from the light-emitting diodes that has bounced off the closed sections of the housing and on to the adhesive layer, and shadows; and wherein the electronic circuit separately controls the groups of light-emitting diodes.

2. The insect light trap of claim 1 wherein the substrate is perforated.

3. The insect light trap of claim 1 wherein said light-emitting diodes and said perforations of said plurality of perforations of the front wall are arranged in a predetermined pattern.

4. The insect light trap of claim 1 wherein said plurality of groups of light-emitting diodes comprises a first group of light-emitting diodes generating light having a wavelength between 500 nm and 590 nm, a second group of light-emitting diodes generating light having a wavelength in the range of 380 nm to 495 nm, and a third group of light-emitting diodes generating light at a wavelength of less than 400 nm.

5. The insect light trap of claim 4 wherein said plurality of groups of light emitting diodes further comprises a fourth group of light-emitting diodes generating soft white light falling within a range extending from 4000K to 6000K.

6. The insect light trap of claim 1 wherein said light-emitting diodes are arranged in a pattern and the substrate includes perforations arranged in the same pattern.

7. The insect light trap of claim 1 wherein said light-emitting diodes include a first group that emits light in the ultra-violet (UV) portion of the light spectrum and at least one other group that emits light in the visible portion of the light spectrum.

8. The insect light trap of claim 1 wherein the openings are elongated.

9. The insect light trap of claim 1 wherein the electronic circuit causes at least one of the light-emitting diodes to flicker.

10. The insect light trap of claim 1 wherein the electronic circuit modulates the intensity of the light generated by at least one of the light-emitting diodes.

11. The insect light trap of claim 1 wherein the circuit adjusts at least one operating parameter of each of the light-emitting diodes used to create the light pattern on the front surface of the substrate.

12. The insect light trap of claim 1 wherein the substrate is coated with an adhesive layer having a glossy finish and which is adapted to capture the flying insects.

13. The insect light trap of claim 12 wherein the light-emitting diodes of a first group of said plurality of groups of light-emitting diodes emit soft white light falling within the range of between 4000K and 6000K, the light-emitting diodes of a second group of said plurality of groups of light-emitting diodes emit light having a wavelength between 500 nm and 590 nm, the light-emitting diodes of a third group of said plurality of groups of light-emitting diodes emit light having a wavelength falling within with the range of 380 nm to 495 nm, and a fourth group of said plurality of groups of light-emitting diodes emit light having a wavelength of less than 400 nm.

14. The insect light trap of claim 13 wherein the light-emitting diodes of the second group of light-emitting diodes emit light having a wavelength of 560 nm.

15. The insect light trap of claim 13 wherein the light-emitting diodes of the third group of light-emitting diodes emit light having a wavelength of 430 nm.

16. The insect light trap of claim 13 wherein the light-emitting diodes of the fourth group of light-emitting diodes emit light having a wavelength of 368 nm.

17. The insect light trap of claim 1 wherein the electronic circuit comprises a microprocessor under program control which controls operation of the light-emitting diodes of each group of light-emitting diodes.

* * * * *